K. VONGEHR.
APPARATUS FOR COLLECTING RAIN WATER FOR DOMESTIC AND OTHER PURPOSES.
APPLICATION FILED MAY 18, 1922.
1,429,051.                                      Patented Sept. 12, 1922.
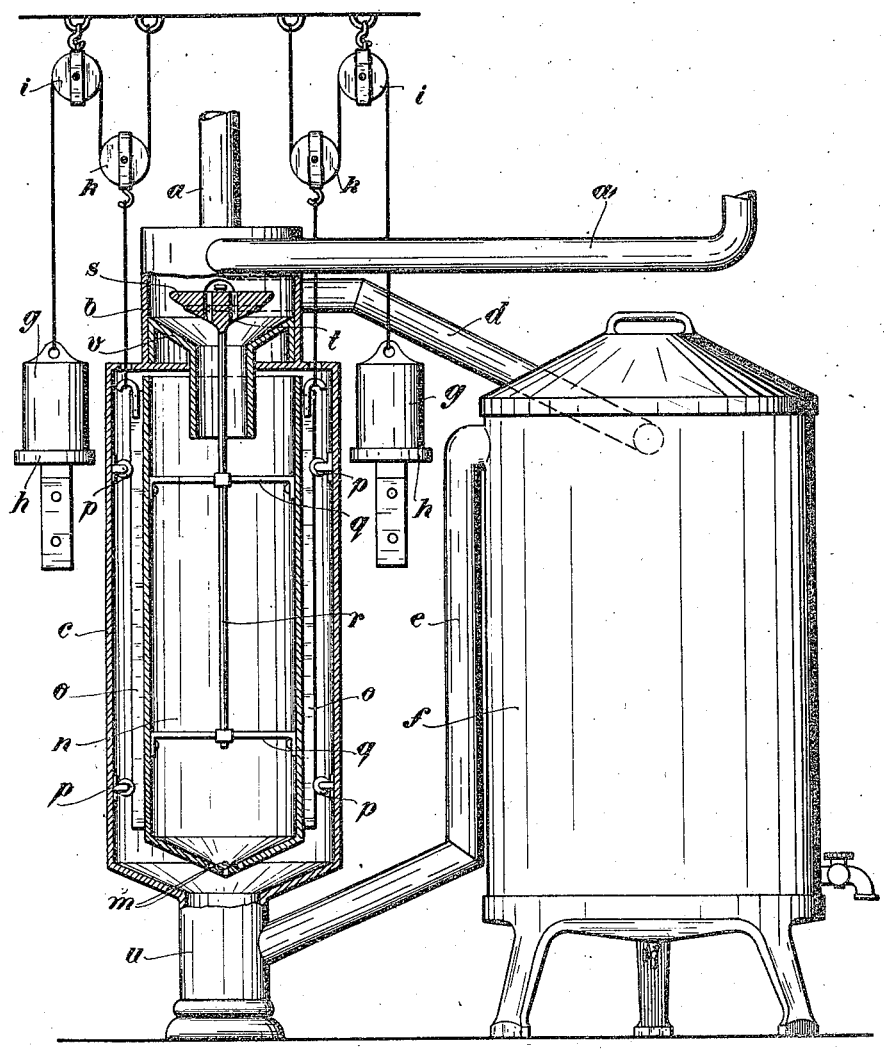

Patented Sept. 12, 1922.

1,429,051

UNITED STATES PATENT OFFICE.

KURT VONGEHR, OF TILSIT, GERMANY.

APPARATUS FOR COLLECTING RAIN WATER FOR DOMESTIC AND OTHER PURPOSES.

Application filed May 18, 1922. Serial No. 561,992.

*To all whom it may concern:*

Be it known that I, KURT VONGEHR, a citizen of Germany, residing at Tilsit, in the State of Prussia, Germany, have invented certain new and useful Improvements in Apparatus for Collecting Rain Water for Domestic and Other Purposes, (for which I have filed applications in Germany, April 4, 1921; France, March 13, 1922; and Great Britain, March 15, 1922); and I do hereby declare the following to be a full, clear, and exact description of the invention, such as will enable others skilled in the art to which it appertains to make and use the same.

My invention relates to improvements in apparatus for collecting rain water for domestic and other purposes to be used for example in laundries, and one of the objects of the improvements is to provide an apparatus by means of which the first volume of rain water which is ordinarily spoilt by dust and other impurities is removed, whereupon the apparatus is automatically set in position for conducting the water to a place of use or storage. With this object in view my invention consists in providing a controlling chamber intermediate the rain water supply and the tank or the like which is adapted to discharge the water into a receptacle adapted when filled with a certain volume of water to close the discharge from the controlling chamber into the same so as to cause the water to flow into the tank. Other objects of the invention will be understood from the following description.

In order that my invention may be more clearly understood an example embodying the same has been shown in the accompanying drawing showing an elevation of the apparatus partly in section.

In the example shown in the drawing my improved apparatus consists of a tank $f$ adapted to store the rain water, a vessel $c$ having a bottom discharge $u$, a receptacle $n$ located within the vessel $c$ and guided by means of longitudinal rails $o$ on rollers $p$, and a controlling chamber $b$ connected with the water supply and the tank $f$ and having a bottom discharge $v$ opening into the receptacle $n$. The receptacle $n$ is suspended from pulley blocks $i$ and $k$ and its weight is balanced by means of weights $g$ normally supported on brackets $h$ secured to a relatively fixed part (not shown). The discharge $v$ is adapted to be partly closed by means of a valve cone or disk $s$ provided with small passages $t$ permitting the passage of a small amount of water therethrough, and the stem $r$ of the valve cone is connected by transverse rods $q$ with the receptacle $n$. The receptacle $n$ is provided with a bottom discharge $m$ the cross-sectional area of which is equal to or a little smaller than that of the passages $t$. The supply of the rain water to the chamber $b$ takes place through one or more pipes $a$, $a^1$, and the chamber is connected at its upper part with the tank $f$ by a pipe $d$. The tank $f$ is provided with an overflow pipe $e$ discharging into the bottom discharge $u$.

Before starting the operation of the system the parts are in the position shown in the figure, the valve $s$ being removed from its seat and opening the discharge $v$. The first volume of rain water admitted through the pipes $a$ or $a^1$ which contains much dust and other impurities flows through the chamber $b$ and into the receptacle $n$ so as to gradually fill the same though a part of the water is discharged through the openings $m$, until the gravity of the water within the receptacle exceeds that of the weights $g$, whereupon the receptacle moves downward and sets the valve disk $s$ on its seat. Now the chamber $b$ is gradually filled with pure water which is discharged through the pipe $d$ and into the tank $f$. Though the water from the receptacle $n$ continues to flow through the openings $m$, the valve $s$ is not raised from its seat, because a corresponding amount flows from the chamber $b$ through the passage $t$ and into the receptacle $n$. As long as the supply of rain water to the chamber $b$ is continued the receptacle $n$ remains in its lowermost position in which it closes the valve $s$. But when the supply of rain water is stopped, the receptacle $n$ is gradually emptied, so that finally the weights $g$ overcome the gravity of the water within the receptacle $n$, and the valve $s$ is unseated, whereupon the system is ready for the next operation.

Preferably a packing ring or the like of rubber is disposed between the valve disk $s$ and its seat $v$, in order to securely close the bottom discharge.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

In an apparatus for collecting rain water, a clear-water reservoir, a drain adjacent thereto and connected thereto by an overflow-pipe, said drain having an upstanding casing $c$, a preliminary receiving-chamber on top of said casing $c$ and having a discharge-opening leading thereinto, said discharge-opening having a valve-seat, a gravitating counter-balanced receptacle mounted in said casing $c$ and means for guiding it therein, said receptacle having a leak-opening at its lower-end, a rod affixed to said receptacle and extending up through the valve-seat surrounding the discharge-opening and provided with a valve at its upper-end adapted to seat on said valve-seat, said valve being provided with a leak-opening, and a pipe leading from the preliminary receiving-chamber at a point above the valve-seat to said clear-water reservoir.

In testimony whereof I hereunto affix my signature in the presence of two witnesses.

KURT VONGEHR.

Witnesses:
 GEORGE JOLLY,
 RICHARD RADVINSKI.